US010200302B2

(12) United States Patent
Ramamoorthy et al.

(10) Patent No.: US 10,200,302 B2
(45) Date of Patent: Feb. 5, 2019

(54) TECHNIQUES FOR ALLOCATING RESOURCES FOR COMMUNICATION IN A COMMUNICATION NETWORK

(71) Applicant: CISCO TECHNOLOGY, INC., San Jose, CA (US)

(72) Inventors: Veena Ramamoorthy, Bangalore (IN); Sudarsan Kannan, Bangalore (IN)

(73) Assignee: Cisco Technology, Inc., San Jose, CA (US)

( * ) Notice: Subject to any disclaimer, the term of this patent is extended or adjusted under 35 U.S.C. 154(b) by 640 days.

(21) Appl. No.: 14/614,044

(22) Filed: Feb. 4, 2015

(65) Prior Publication Data
US 2016/0226791 A1 Aug. 4, 2016

(51) Int. Cl.
G06F 15/16 (2006.01)
H04L 12/911 (2013.01)
H04L 29/06 (2006.01)

(52) U.S. Cl.
CPC .......... *H04L 47/783* (2013.01); *H04L 65/104* (2013.01); *H04L 65/1069* (2013.01)

(58) Field of Classification Search
USPC .......... 709/220, 226, 229; 370/321; 455/456
See application file for complete search history.

(56) References Cited

U.S. PATENT DOCUMENTS

| | | | | |
|---|---|---|---|---|
| 7,143,168 B1* | 11/2006 | DiBiasio | ............. | H04L 12/5695 370/395.4 |
| 7,626,997 B2* | 12/2009 | Yoshikawa | ......... | H04L 43/0876 370/321 |
| 8,639,775 B2* | 1/2014 | Nakagawa | ............ | G06F 3/0604 709/217 |
| 2006/0248205 A1* | 11/2006 | Randle | ................ | H04L 63/0869 709/229 |
| 2007/0086432 A1* | 4/2007 | Schneider | ........... | H04M 3/5307 370/352 |
| 2007/0086433 A1* | 4/2007 | Cunetto | ................... | H04L 12/58 370/352 |
| 2007/0086438 A1* | 4/2007 | Schneider | ......... | H04L 29/06027 370/352 |
| 2007/0115921 A1* | 5/2007 | Schneider | ........... | H04L 12/5855 370/352 |
| 2007/0115922 A1* | 5/2007 | Schneider | ........... | H04L 12/1859 370/352 |
| 2007/0116234 A1* | 5/2007 | Schneider | ............... | H04M 3/58 379/219 |

(Continued)

*Primary Examiner* — Thanh T Nguyen
(74) *Attorney, Agent, or Firm* — Patterson + Sheridan, LLP

(57) ABSTRACT

Techniques for allocating resources for communication in a communication network are disclosed. In one particular embodiment, the techniques may be realized as a method for allocating resources for communication in a communication network comprising receiving a request for a session associated with a mobile device from a mobility management device, wherein the request comprises a group identifier identifying a group of communication sessions in which the requested session is a member; receiving the service plan associated with the group of communication sessions; allocating shared resources to the group of communication sessions in accordance with the service plan; and sending a response to the mobility management device, indicating that the requested session has been established for the mobile device.

20 Claims, 7 Drawing Sheets

(56) References Cited

U.S. PATENT DOCUMENTS

| | | | |
|---|---|---|---|
| 2008/0013531 A1* | 1/2008 | Elliott | H04L 12/6418 370/356 |
| 2010/0069091 A1* | 3/2010 | El-Saidny | H04L 12/189 455/456.3 |
| 2016/0066345 A1* | 3/2016 | Sun | H04W 74/006 370/329 |

* cited by examiner

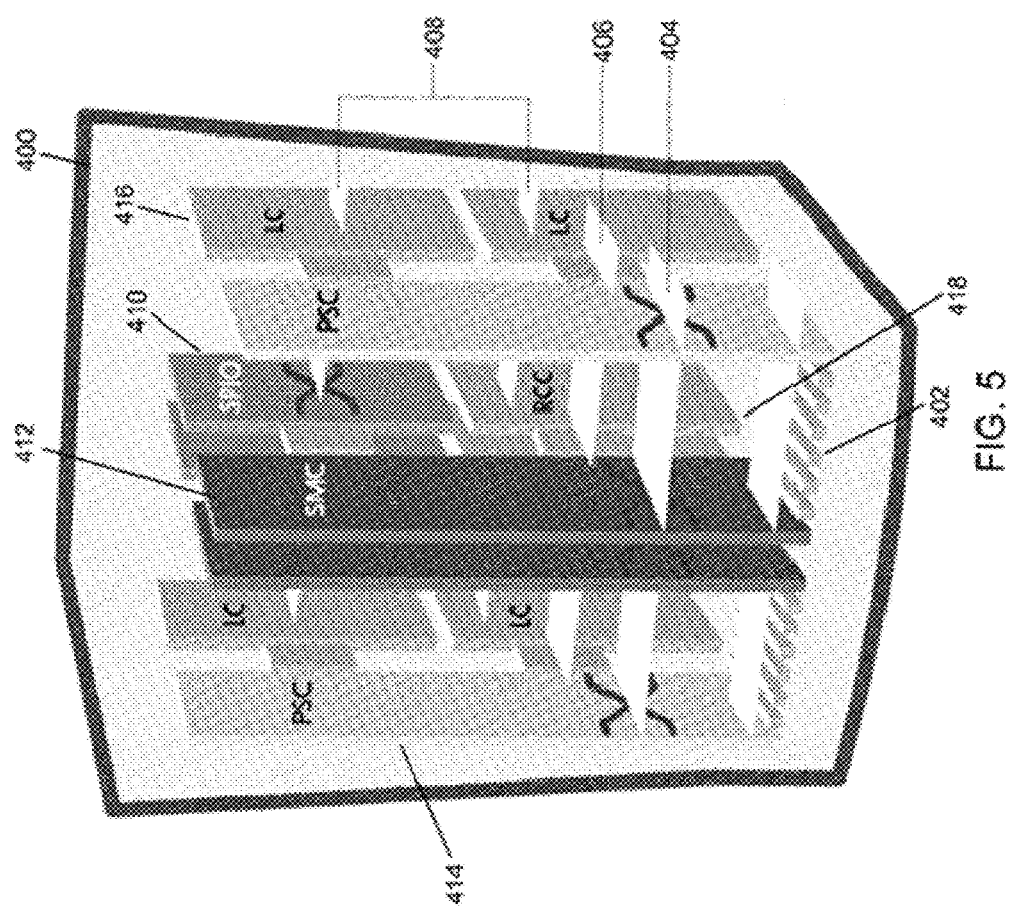

TECHNIQUES FOR ALLOCATING RESOURCES FOR COMMUNICATION IN A COMMUNICATION NETWORK

FIELD OF THE DISCLOSURE

The present disclosure relates generally to managing communication sessions, and more particularly, to techniques for allocating resources for communication in a communication network.

BACKGROUND OF THE DISCLOSURE

Networking architectures have grown increasingly complex in communication environments. As the subscriber base increases and/or becomes mobile, proper routing and efficient management of communication sessions and data flows becomes important.

Oftentimes, a network service provider (also referred to as a network operator) provides network services to a subscriber based on a service plan associated with the subscriber. The service plan can indicate the quota of data volume that can be transmitted and/or received by the subscriber. The service plan can also indicate the policy for managing the subscriber's mobile device. The policy can indicate, for example, whether the subscriber's mobile device can communicate over a Long Term Evolution (LTE) network, whether the subscriber's mobile device can access the operator's communication network using a Wireless Local Area Network (WLAN), and/or whether the subscriber's mobile device should be guaranteed a minimum Quality of Service (QoS) or data throughput in communication.

A network operator may host several communication sessions that are subject to a single service plan. For example, several subscribers may establish independent communication sessions, each of which may be subject to a family plan. As another example, a single subscriber may establish multiple communication sessions, each of which may be subject to a single service plan for the subscriber.

Traditionally, a network operator managed multiple sessions associated with a single service plan using a Policy and Charging Rules Function (PCRF) and/or an Online Charging System (OCS). The PCRF/OCS was configured to maintain information associated with the multiple sessions, and to recognize that the multiple sessions are associated with a single service plan. Furthermore, the PCRF/OCS was configured to ensure that the multiple sessions complied with the quota and/or policy requirement of the single service plan.

For example, suppose that a subscriber is subscribed to a service plan that provides a 3 mega-bytes-per-second (MBPS) throughput and 3 giga-byte (GB) of quota, and the subscriber's mobile device initiates three communication sessions at the same time under the service plan. In this case, the OCS can allocate 1 GB of quota per session and the PCRF can allocate 1 MBPS of throughput per session. This way, the PCRF/OCS ensures that the subscriber does not consume more communication bandwidth or communication capacity than is authorized under the single service plan.

Unfortunately, the PCRF/OCS may inadvertently deteriorate subscriber experience in one of the sessions due to inappropriate allocation of resources. Referring back to the example provided above, while allocating an equal amount of quota and throughput to each of the sessions is a reasonable way to ensure compliance with the service plan, such an equal allocation of resources does not take into account the fact that one of the sessions may require more quota and/or throughput compared to another. For instance, one of the three sessions may be associated with an audio stream and another one of the three sessions may be associated with a video stream. In this instance, the audio stream would require significantly less quota and throughput compared to the video stream. Therefore, the video stream may be throttled for the lack of resources, even though the subscriber may have plenty of resources available for the audio stream. Therefore, allocating the same amount of quota and throughput to both the audio stream and the video stream would be suboptimal from the user experience perspective. A similar problem can also exist in cases where multiple mobile devices are subject to a single family service plan. This type of problem is often referred to as a fragmentation of resources.

In view of the foregoing, it may be understood that there may be significant problems and shortcomings associated with current technologies for managing multiple communication sessions associated with a single service plan.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be illustrative only.

FIG. 5 illustrates a network device in accordance with some embodiments.

DETAILED DESCRIPTION OF EMBODIMENTS

Figure 1:
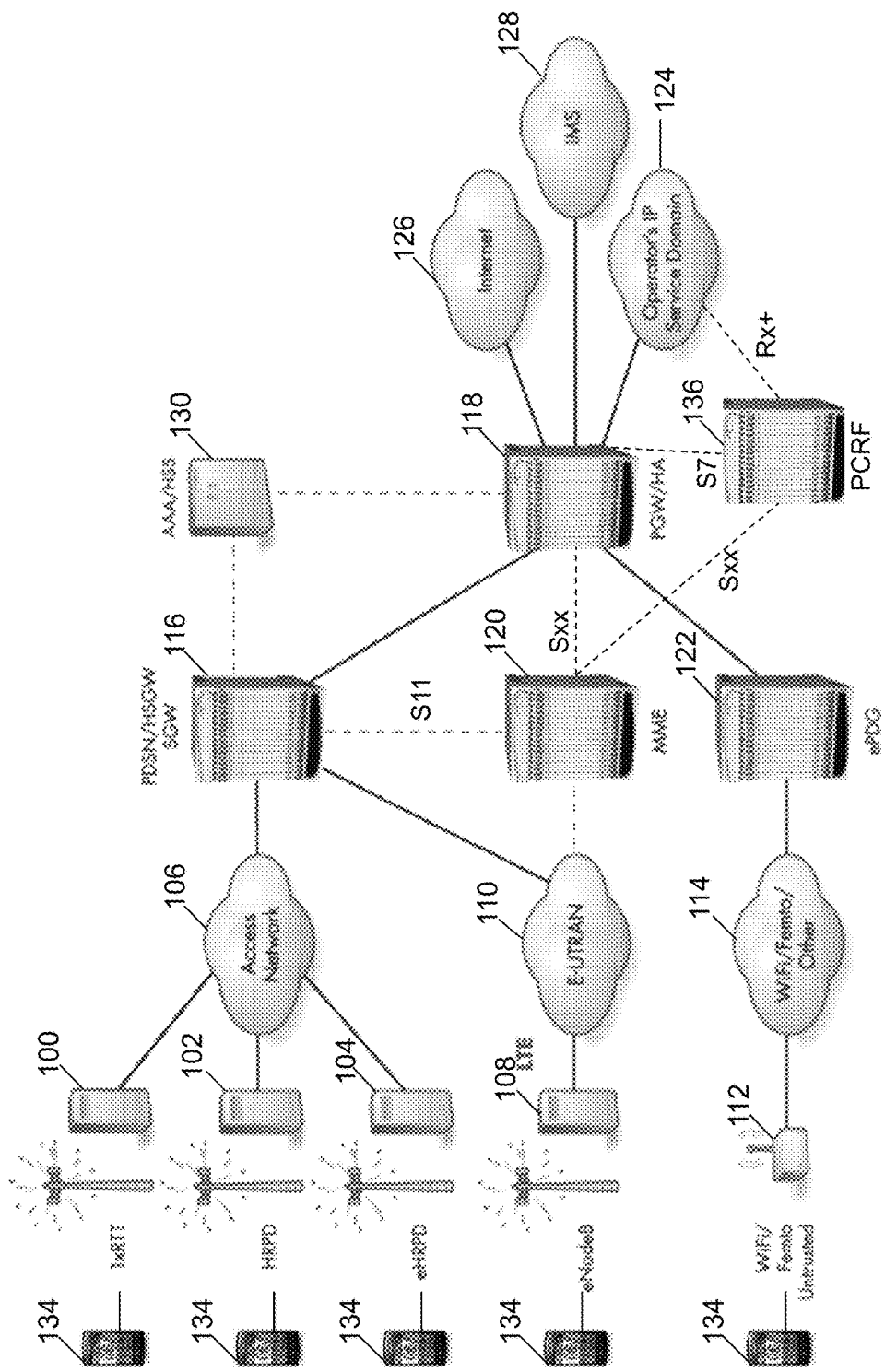
FIGS. 1-2 illustrate a communication network including a long term evolution (LTE) topology in accordance with some embodiments.

To address the problem of fragmentation of resources, the present disclosure provides a mechanism for managing multiple sessions at a gateway, instead of a PCRF and/or an OCS. In a communication network, a gateway is in a better position, compared to a PCRF and/or an OCS, to manage multiple sessions in accordance with a service plan. As discussed further below, a gateway is located on a user data plane (also known as a bearer plane) between a mobile device and a core network. Thus, a gateway can analyze packets transmitted from and/or received by a communication session to track the amount of resources (e.g., a volume of communicated data and/or a data throughput) consumed by the communication session. The gateway can perform this operation independently for each of the communication sessions hosted at the gateway in order to track the amount of resources consumed by each of the communication sessions.

When multiple communication sessions are subject to the same service plan, the gateway can aggregate the amount of resources consumed by communication sessions subject to the same service plan. This way, the gateway can determine the total amount of resources consumed by sessions subject to the same service plan. The gateway can use this total amount of resources to manage the sessions in accordance with the service plan. For example, when the total amount of resources consumed by the sessions exceeds the amount of resources that can be consumed under the service plan, the gateway can stop the network service to all communication sessions subject to the service plan. This multiple session management (MSM) mechanism does not require any division of resources amongst communication sessions, as was done by the PCRF/OCS. Therefore, the MSM mechanism does not suffer from fragmentation of resources. Furthermore, the MSM mechanism can reduce the number of control messages communicated between network devices in the core network. Therefore, the network operator can reduce the operating expense of the network.

Because a gateway can manage only the sessions hosted by itself, a network operator can implement a session assignment mechanism to provide that sessions subject to the same service plan are hosted by a single gateway (or a single session control process). For example, a network operator can install a module in a mobility management entity (MME) of the network to assign communication sessions subject to the same service plan to a single gateway.

In some embodiments, a gateway can communicate with a service plan maintenance device that supports service data flow detection, policy enforcement and flow-based charging. The service plan maintenance device can also allow a network operator to charge their customers, in real time, based on service usage. The service plan maintenance device can include a PCRF 136 and/or an OCS.

In some embodiments, a gateway can receive information about the service plan from a service plan maintenance device. For example, when one of the communication sessions associated with a service plan is assigned to a gateway and the gateway does not already have information about the service plan, the gateway can request the PCRF/OCS to provide information about the service plan. The information about the service plan can include, for example, the quota and the maximum data throughput for the communication sessions subject to the service plan.

FIG. 1 illustrates a communication system with parallel networks in accordance with some embodiments. FIG. 1 includes a number of radio access technologies such as a 1×RTT transceiver 100, a high-rate packet data (HRPD) transceiver 102, and an evolved high-rate packet data (eHRPD) transceiver 104, each of which can connect to an access network 106. An evolved Node B (eNodeB) transceiver 108 is an LTE network radio network component that connects to an Evolved UMTS Terrestrial Radio Access Network (E-UTRAN) 110. Other radio access technologies such as Wi-Fi, Femto, WiMAX, or any other radio spectrum technology, can use a transceiver shown generally at 112 to connect a user equipment (UE) 134 to the network using a broadband or other access network.

The access network 106 can communicate with an access gateway 116 that implements a combination of functionalities such as a packet data serving node (PDSN), a HRPD serving gateway (HSGW), and a serving gateway (SGW). In operation, the PDSN functionality can be used with 1×RTT 100, the HSGW functionality can be used with HRPD 102 and eHRPD 104, and the SGW functionality can be used with the eNodeB 108. The access gateway 116 can communicate with an anchor gateway 118, such as a packet data network gateway (PGW), and a mobility management entity (MME) 120. On the access network side, the anchor gateway 118 can also communicate with an evolved packet data gateway (ePDG) 122 that provides connectivity to the Wi-Fi/Femto/other transceiver 112. On the packet core side, the anchor gateway can communicate with the operator's IP service domain 124, the Internet 126, IP multimedia subsystem (IMS) 128, a data center 132, and a video server 136. An authentication, authorization, and accounting (AAA) server/home subscriber server (HSS) 130 can communicate with the access gateway 116, the anchor gateway 118, or both.

The Home Subscriber Server (HSS) 130 can be a master user database that supports IMS network entities that handle calls. The HSS 130 stores subscription-related information (subscriber profiles), performs authentication and authorization of the user, and can provide information about the subscriber's location and IP information. The HSS 130 also maintains binding information on which gateway is currently serving a user equipment. Even when the user equipment 134 is detached from the network, the HSS 130 maintains the binding information until the user equipment 134 re-attaches itself and updates the binding information. The AAA server 130 can provide authentication, access control, and accounting to the network. The authentication can involve verification of the subscriber, the access control can involve granting or denying access to specific services, and the accounting that can take place is the tracking of the use of network resources by subscribers. Other servers, such as the Home Location Register (HLR) can be used in other embodiments. In some embodiments, the AAA/HSS 130 can communicate with the access gateway 116 for charging purposes.

The LTE communication network includes a PDN gateway (PGW) 118, a serving gateway (SGW) 116, an E-UTRAN (evolved-UMTS terrestrial radio access network) 110, and a mobility management entity (MME) 120. The evolved packet core (EPC) of an LTE communication network includes the MME 120, SGW 116 and PGW 118 components. In some embodiments, one or more EPC components can be implemented on the same gateway or network device as described below.

The SGW sits in the user plane where it forwards and routes packets to and from the eNodeB and PGW. The SGW also serves as the local mobility anchor for inter-eNodeB handover and mobility between 3GPP networks. The SGW routes and forwards user data packets, while also acting as the mobility anchor for the user plane during inter-eNB handovers and as the anchor for mobility between LTE and other 3GPP technologies (terminating S4 interface and relaying the traffic between 2G/3G systems and PGW). For idle state user equipments, the SGW terminates the down link data path and triggers paging when down link data arrives for the user equipment. The SGW manages and stores user equipment contexts, e.g. parameters of the IP bearer service and network internal routing information. The SGW also performs replication of the user traffic in case of lawful interception.

The PGW acts as the interface between the LTE network and other packet data networks, such as the Internet or SIP-based IMS networks (fixed and mobile). The PGW serves as the anchor point for intra-3GPP network mobility, as well as mobility between 3GPP and non-3GPP networks. The PGW acts as the Policy and Charging Enforcement Function (PCEF), which manages Quality of Service (QoS), online/offline flow-based charging data generation, deep-packet inspection, and lawful intercept. The PGW provides connectivity to the UE to external packet data networks by being the point of exit and entry of traffic for the UE. A UE may have simultaneous connectivity with more than one PGW for accessing multiple packet data networks. The PGW performs policy enforcement, packet filtering for each user, charging support, lawful interception, and packet screening. The PGW also provides an anchor for mobility between 3GPP and non-3GPP technologies such as WiMAX and 3GPP2 standards (CDMA 1× and EVDO).

Policy and charging rules function (PCRF) 136 can determine the policy rules associated with subscribers in a communication network. The PCRF 136 can access subscriber databases and charging systems in a scalable manner. The PCRF 136 can communicate with the network operator's IP service domain over an Rx+ interface. The PCRF 136 can also communicate with a PGW 118 over an S7 interface. In some embodiments, the PCRF 136 can also communicate with an MME 120 over a new signalling interface, referred to as an Sxx interface.

The MME 120 resides in the EPC control plane and manages session states, authentication, paging, mobility with 3GPP 2G/3G nodes, roaming, and other bearer management functions. The MME 120 can be a standalone element or integrated with other EPC elements, including the SGW, PGW, and Serving GPRS Support Node (SGSN). The MME 120 can also be integrated with 2G/3G elements, such as the SGSN and GGSN. This integration is the key to mobility and session management interworking between 2G/3G and 4G mobile networks.

MME 120 is a control-node for the LTE access network. The MME 120 is responsible for UE tracking and paging procedures including retransmissions. MME 120 handles the bearer activation/deactivation process and is also responsible for choosing the SGW for a UE at the initial attach and at time of an intra-LTE handover. The MME 120 also authenticates the user by interacting with the HSS 130. The MME also generates and allocates temporary identities to UEs and terminates Network Access Server (NAS) signaling. The MME 120 checks the authorization of the UE to camp on the service provider's Public Land Mobile Network (PLMN) and enforces UE roaming restrictions. The MME 120 is the termination point in the network for ciphering/integrity protection for NAS signaling and handles the security key management. Lawful interception of signaling is also supported by the MME 120. The MME 120 also provides the control plane function for mobility between LTE and 2G/3G access networks with the S3 interface terminating at the MME from the SGSN (not shown). The MME 120 also terminates the S6a interface towards the home HSS for roaming UEs. The MME 120 can communicate with the SGW 116 over a S11 interface. In some embodiments, the MME 120 can communicate with a PGW 118 over a new, directly connected interface, including an Sxx signalling interface. In other embodiments, the MME 120 can communicate with a PGW 118 via a SGW over proxied interfaces, S5 and S11. In some embodiments, the MME 120 can communicate with operator's IP services over an Sxx interface.

The ePDG 122 is responsible for interworking between the EPC and fixed non-3GPP access technologies such as a Wi-Fi, WiMAX access networks. The ePDG 122 can use IPSec/IKEv2 to provide secure access to the EPC network. Optionally, the ePDG can use Proxy Mobile IPv6 (PMIPv6) to interact with the PGW when the mobile subscriber is roaming in an untrusted non-3GPP system. The ePDG is involved in tunnel authentication and authorization, transport level packet marking in the uplink, policy enforcement of Quality of Service (QoS) based on information received via Authorization, Authentication, Accounting (AAA) infrastructure, lawful interception, and other functions.

Figure 2:
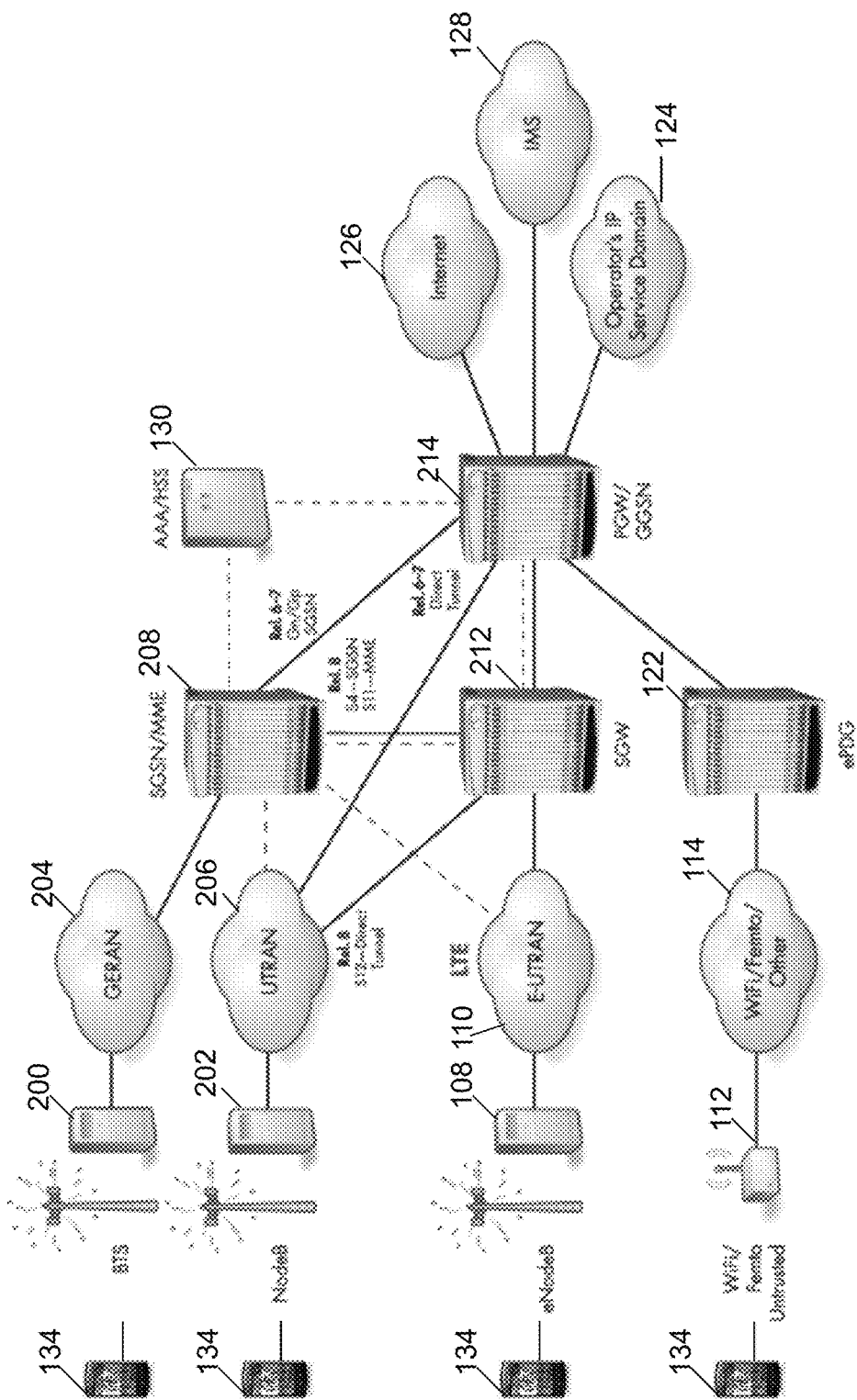

FIG. 2 illustrates a communication system with parallel networks in accordance with legacy universal mobile telecommunications systems (UMTS) network devices in accordance with some embodiments. The legacy transceivers include base transceiver station (BTS) 200 and NodeB transceiver 202. The BTS 200 can communicate with a GSM EDGE Radio Access Network (GERAN) 204 and the NodeB 202 can communicate with a UMTS terrestrial radio access network (UTRAN) 206. The serving GPRS support node (SGSN) can be implemented on a gateway 208 with a mobility management entity (MME). The GERAN 204 can communicate through the SGSN functionality on gateway 208 to serving gateway (SGW) 212 or gateway GPRS support node (GGSN)/PGW 214.

In some embodiments, the MSM mechanism can be implemented, in part, on gateways, such as PGW/HA 118, PDSN/HSGW/SGW 116, SGSN/MME 208, PGW/GGSN 214, or SGW 212. The gateways can access and maintain information relating to the communication session, the subscriber, the radio bearers, and the policies relating to the communication session. The gateways may be used to provide various services to a user equipment 134 and implement the quality of service (QoS) on packet flows. Several of these functions are used in providing, for example, voice over IP (VoIP) routing and enhanced services, such as enhanced charging, stateful firewalls, traffic performance optimization (TPO). The communication networks also allow provision of applications such as VoIP, streaming video, streaming music, multi-user gaming, location based services, and a variety of delivered to a user equipment. Residing within the gateways can be one or more network processing units, line cards, packet processing cards, system management cards, and interfaces in some embodiments.

Figure 3:
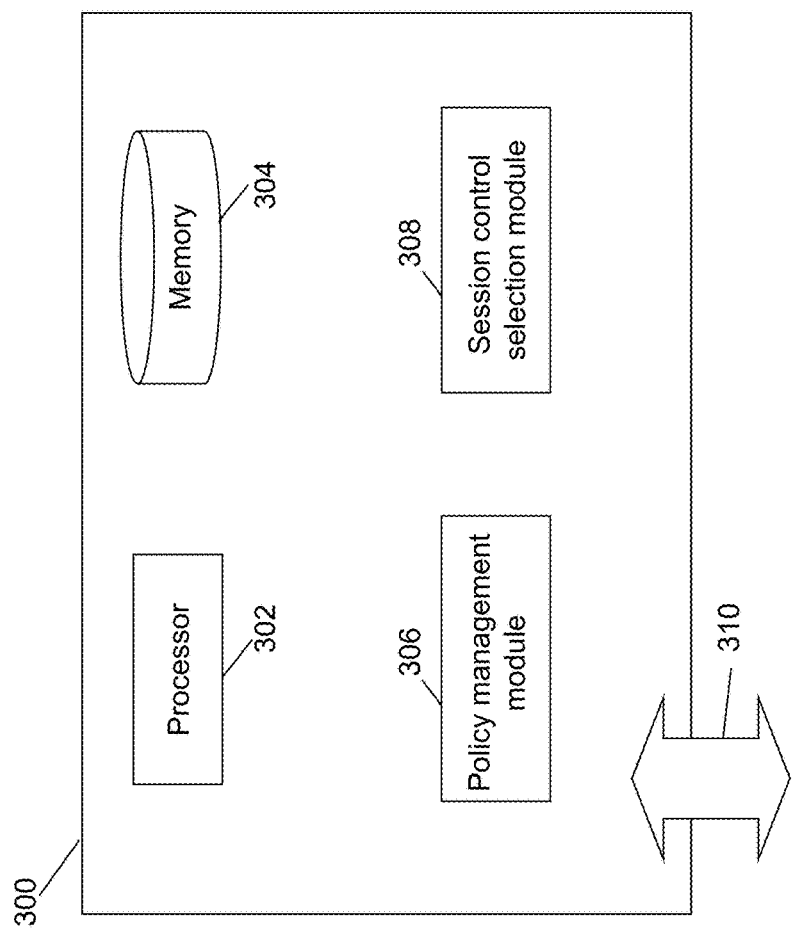
FIG. 3 shows a diagram of a gateway that is capable of implementing a multiple session management (MSM) mechanism in accordance with some embodiments.

FIG. 3 shows a diagram of a gateway that is capable of implementing a MSM mechanism in accordance with some embodiments. The gateway 300 can include one or more of: a processor 302, a memory 304, a service plan management module 306, a session control selection module 308, and an interface 310.

In some embodiments, the service plan management module 306 can be configured to receive information about a service plan for a group of communication sessions. The service plan management module 306 can receive the service plan from the PCRF 136/OCS. The service plan can include the maximum data quota, the maximum data throughput, the minimum quality of service (QoS), the communication bandwidth for the service plan, and/or any combinations thereof. In some embodiments, the data quota can be provided in terms of data volume, or in terms of the time duration. In some embodiments, the service plan can be provided as a Policy and Charging Control (PCC) rule. Subsequently, the service plan management module 306 can enforce the service plan requirements to manage the group of communication sessions subject to the service plan.

In some embodiments, the service plan management module 306 can be configured to maintain a resource status of a service plan. For example, when a service plan is associated with a single communication session, then the service plan management module 306 can be configured to track the amount of resources consumed by the single communication session and maintain the amount as a resource status of the service plan. As another example, when a service plan is associated with multiple communication sessions, then the service plan management module 306 can be configured to track the amount of resources consumed by the multiple communication sessions and maintain the amount as a resource status of the service plan. As discussed earlier, in some cases, the multiple communication sessions can be established by a single UE; in other cases, the multiple communication sessions can be established by multiple UEs.

In some embodiments, the service plan management module 306 can be configured to refresh the resource status when a new service plan cycle begins. For example, when subscribers have subscribed to a monthly contract with the network operator, the service plan management module 306 can refresh the resource status of the subscribers every month, for example, on a predetermined date.

In some embodiments, a gateway 300 can include a plurality of session control processes, each of which is capable of independently hosting one or more communication sessions. For instance, a gateway 300 can include a plurality of blades each operating as an independent gateway module. In such an instance, the gateway 300 can use a session control selection module 308 to select one of the session control processes to host a particular communication session. For example, a session control selection module 308 is configured to receive a create session request from a mobility management device, such as an MME 120. The create session request can include a group identifier that identifies a group of communication sessions that are subject to the same service plan. In response to receiving the create session request, the session control selection module 308 can select one of a plurality of session control processes to host the session associated with the create session request. In some embodiments, the session control selection module 308 is configured to select one of the session control processes based on a group identifier associated with the create session request. This way, sessions in the same group (i.e., sessions associated with the same group identifier) can be assigned to the same session control process.

In some embodiments, the service plan management module 306 and the session control selection module 308 can be implemented in software using the memory 304 such as a non-transitory computer readable medium, a programmable read only memory (PROM), or flash memory. The software can run on a processor 302 that executes instructions or computer code. The service plan management module 306 and the session control selection module 308 may also be implemented in hardware using an application specific integrated circuit (ASIC), programmable logic array (PLA), or any other integrated circuit.

An interface 310 can provide an input and/or output mechanism to communicate with other network devices, including an MME 120. In particular, the interface 310 can include the S11 interface or the Sxx interface for communication with the MME. The interface can also include a General Packet Radio Service tunneling protocol (GTP) tunnel for communication with an MME 120. The interface 310 can also provide communication with gateways and UEs 134, as well as other core network nodes to send and receive control data. The interface 314 can be implemented in hardware to send and receive signals in a variety of mediums, such as optical, copper, and wireless, and in a number of different protocols some of which may be non-transient and/or non-transitory.

In some embodiments, the gateway 300 can include PGW/HA 118, PDSN/HSGW/SGW 116, SGSN/MME 208, PGW/GGSN 214, and/or SGW 212.

Figure 4A:
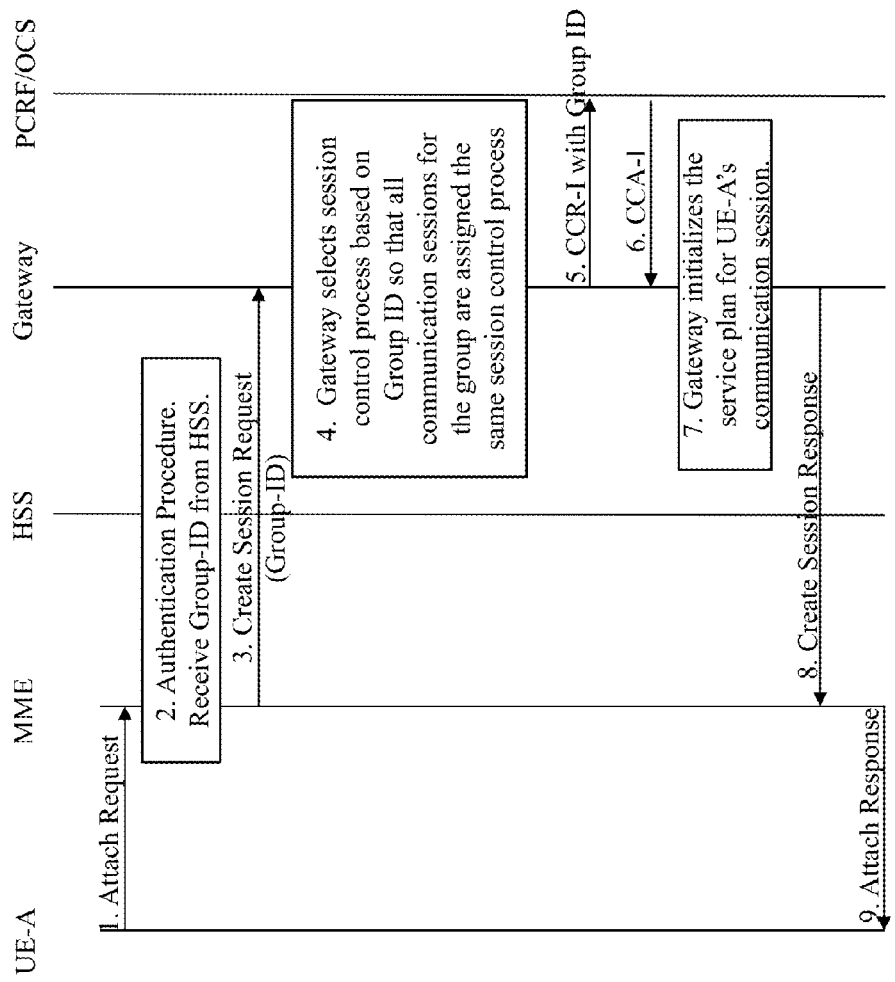
FIGS. 4A-4B illustrate an MSM process implemented at a gateway in accordance with some embodiments.
Figure 4B:
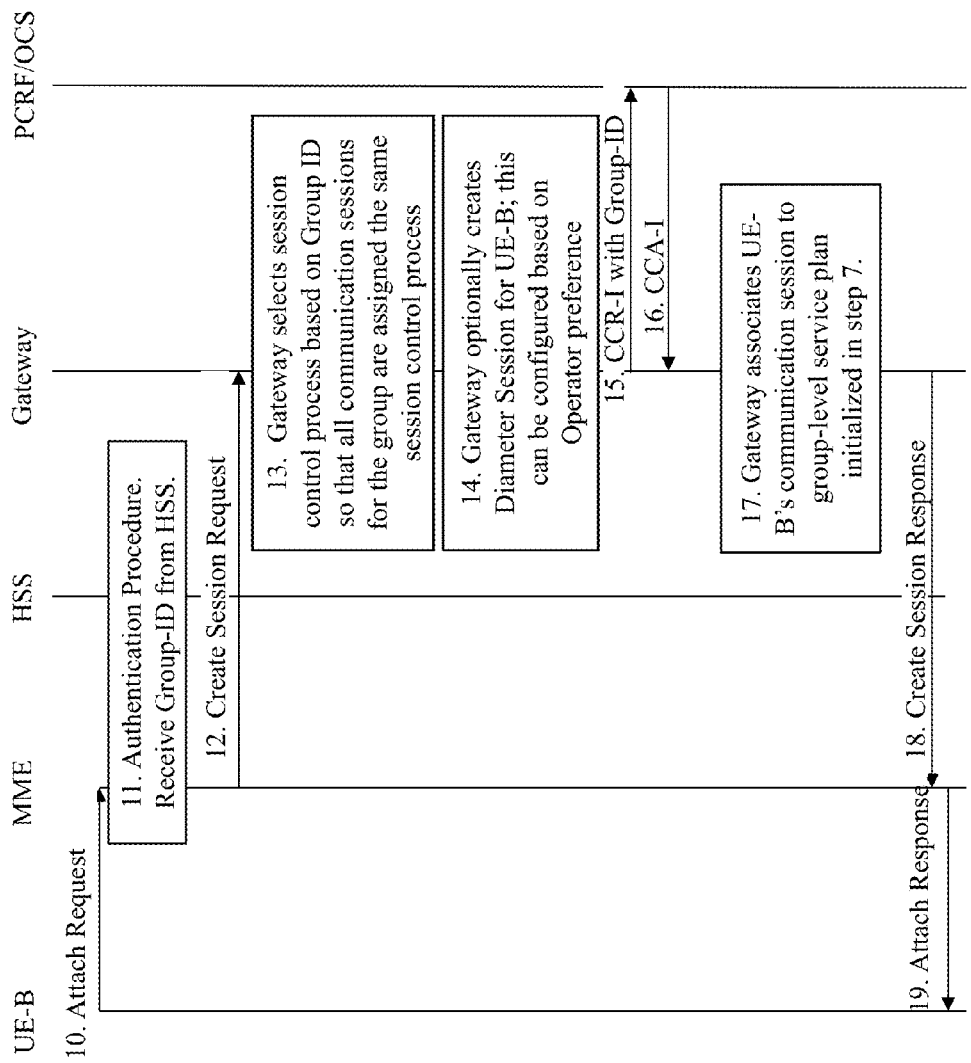

FIGS. 4A-4B illustrate a MSM process implemented at a gateway in accordance with some embodiments. Steps 1-9 illustrate a MSM process when a UE-A attaches to a communication network. The UE-A is presumed to belong to a group of UEs associated with a group identifier. Also, the UE-A is presumed to be the first UE to attach to the communication network since the service plan for the group of UEs has been established or refreshed.

In step 1, the UE-A transmits an attach request to an MME 120. In step 2, the MME 120 executes an authentication procedure with the HSS 130. In particular, the MME 120 can send a Notify Request to the HSS 130, and receive, from the HSS 130, a group identifier associated with the UE-A. In some embodiments, a group identifier can be an unsigned integer variable or a string variable, for example, "Group A" and "Group B". In some embodiments, a group identifier can be a unique parameter that is preconfigured on HSS/SPR and the format of the unique parameter for the group identifier can be left to operator to decide. On a Diameter communication session, the group identifier can be an OCTET-STRING type of Attribute-Value Pairs so that the operator can use it as desired.

The HSS 130 can determine the group identifier based on the UE-A's profile information. The UE-A's profile information can indicate that all communication sessions requested and maintained for the UE-A should be assigned the particular group identifier. The UE-A's profile information can be stored in a database in HSS 130.

In step 3, the MME 120 can send a create session request to the gateway 300. The create session request can include the group identifier determined in step 2. This way, the gateway 300 becomes aware that the create session request is associated with a group of communication sessions subject to the same service plan.

In step 4, optionally, when the gateway 300 includes a plurality of session control processes (e.g., the gateway 300 is implemented in a distributed manner), the gateway 300 can use the session control selection module 308 to select one of the session control processes to create a session. In some embodiments, the session control selection module 308 can select one of the session control processes based on the group identifier received in step 3. This way, all communication sessions associated with the same group identifier can be assigned to the same session control process. This allows the selected session control process to monitor the packet flow of all sessions associated with the group and enforce the service plan at a group level, as discussed further below. When the gateway 300 includes only one session control process, then step 4 can be skipped.

In step 5, the gateway 300 uses the service plan management module 306 to initiate a credit authorization process with a service plan maintenance device, such as the PCRF 136/OCS. The service plan management module 306 is configured to select the service plan maintenance device based on the group identifier associated with the UE-A. Subsequently, the service plan management module 306 is configured to send a service plan request to the selected service plan maintenance device. In some embodiments, the service plan request can be sent to the selected service plan maintenance device using the Diameter messaging protocol. For example, the service plan management module 306 can send, to the selected service plan maintenance device, a Credit Control Request Initialization (CCR-I) message, which can include the group identifier received in step 3.

When the UE-A is a member of a group of UEs subject to the same service plan, the service plan management module 306 is configured to avoid duplicating the resource allocation to the group. To this end, in some embodiments, the service plan management module 306 is configured to include, in the CCR-I, the resource status associated with the group identifier. The resource status associated with the group identifier would indicate whether the UE-A is the first UE, amongst its group, to attach to the network. When the UE-A is the first UE to attach to the network, the resource status would indicate that no resources associated with the group has been consumed. In contrast, when the UE-A is not the first UE to attach to the network, the resource status would indicate that some resources associated with the group has already been consumed. Therefore, the resource status can be analyzed to determine whether the UE-A is the first UE to attach to the network. In this case, since the UE-A is the first UE to attach to the network, the resource status for the group would indicate that no resources associated with the group has been consumed.

Once the service plan maintenance device receives the CCR-I, the service plan maintenance device can retrieve, from the CCR-I, the service plan associated with the UE-A. When the CCR-I includes the group identifier, the service plan maintenance device can retrieve, from the CCR-I, the group identifier and determine the service plan associated with the group identifier. When the CCR-I also includes the resource status associated with the group identifier, the service plan maintenance device can retrieve, from the CCR-I, the resource status. In this example, the resource status would indicate that the UE-A is the first UE amongst its group to attach to the network. Therefore, the service plan maintenance device can be assured that there would be no duplicate allocation of resources to the group.

In step 6, the service plan maintenance device sends a service plan response to the service plan management module 306. The service plan response can comprise a Control Answer Initialization (CCA-I) message. The CCA-I message can include the service plan associated with the UE-A's communication session. The service plan can indicate the amount of resources to be assigned to the UE-A's communication session or to the group in which the UE-A's communication session is a member.

In some embodiments, the service plan may be uniquely associated with the UE-A's communication session. In this case, the service plan management module 306 can store the service plan at a memory location uniquely associated with the UE-A's communication session.

In other embodiments, the service plan may be indirectly associated with the UE-A. For example, the service plan may be associated with a group of communication sessions in which the UE-A's communication session is a member. Such a service plan can be referred to as a group-level service plan. When the service plan management module 306 receives a group-level service plan, the service plan management module 306 can store the group-level service plan at a common heap so that all communication session associated with the same group can access the group-level service plan.

In step 7, the service plan management module 306 initializes the service plan for the UE-A's communication session. The initialization of the service plan can involve allocating resources for the communication session based on the service plan. For example, when the service plan indicates that the UE-A's communication session or the group of communication sessions can transmit or receive 3 GB of data, the service plan management module 306 can allocate 3 GB of data capacity for the UE-A or the group. As another example, when the service plan indicates that the UE-A's communication session or the group of communication sessions can transmit or receive 3 GB of additional data, the service plan management module 306 can allocate 3 GB of data capacity for the UE-A or the group, in addition to the data capacity already allocated to the UE-A or the group.

In step 8, the gateway 300 can respond to the MME 120 that the UE-A's communication session has been established, and in step 9, the MME 120 can send to the UE-A an attach response, indicating that the UE-A is now attached to the communication network.

Once the UE-A is successfully attached to the communication network, the service plan management module 306 can track the use of resources by the UE-A's communication session. When the UE-A's communication session is subject to its own service plan, the service plan management module 306 can accumulate the use of resources as the resource status associated uniquely with the UE-A's communication session. When the UE-A's communication session is subject to a group-level service plan, the service plan management module 306 can accumulate the use of resources as the resource status associated with the group-level service plan.

When the UE-A's communication session exhausts the resources allocated to the UE-A's communication session or its group, the service plan management module 306 can decommission the UE-A or its group to stop UE-A's use of the communication network.

Steps 10-19 illustrate a MSM process when a UE-B attaches to the communication network. The UE-B is presumed to belong to the same group of UEs as the UE-A. Therefore, the UE-B is associated with the same group identifier as the UE-A. However, the UE-B is presumed to be the second UE to attach to the communication network since the service plan for the group of UEs has been established or refreshed.

In step 10, the UE-B transmits an attach request to an MME 120 after the UE-A attaches to the communication network, but otherwise independently of the UE-A's operation. In step 11, the MME 120 performs an authentication procedure with the HSS 130. In particular, the MME 120 can send a Notify Request to the HSS 130, and receive, from the HSS 130, a group identifier associated with the UE-B. The HSS 130 can provide the group identifier based on the UE-B's profile information. The UE-B's profile information can indicate that all communication sessions requested and maintained for the UE-B should be assigned a specific group identifier. The UE-B's profile information can be stored in a database in HSS 130. Since the UE-A and the UE-B belong to the same group, the group identifier for the UE-B is the same as the group identifier for the UE-A.

In step 12, the MME 120 can send a create session request to the gateway 300. The create session request can include the group identifier of the UE-B identified in step 11. This way, the gateway 300 becomes aware that the create session request is associated with a UE that is in the same group as the UE-A.

In step 13, optionally, when the gateway 300 includes a plurality of session control processes (e.g., the gateway 300 is implemented in a distributed manner), the gateway 300 can use a session control selection module 308 to select one of the session control processes to host the session for the attach request in step 10. In some embodiments, the session control selection module 308 can select one of the session control processes based on the group identifier received in step 12. This way, the communication session for the UE-B can be hosted in the same session control process as that of the UE-A.

In some embodiments, the service plan management module 306 can be configured to select a service plan maintenance device, such as a PCRF 136/OCS, based on the group identifier associated with the UE-B. This way, the service plan management module 306 can select, for the UE-B, the same service plan maintenance device as that of the UE-A.

In some embodiments, the service plan management module 306 can be configured to determine that the UE-B and the UE-A belong to the same group and that the resources for the group have already been allocated (e.g., when the UE-A attached to the network). In this case, the service plan management module 306 can be configured to skip steps 14 and 15 to establish a diameter session with the service plan maintenance device since the resources for the UE-B have already been allocated. However, the service plan management module 306 can also be configured to perform steps 14 and 15, even when the resources for the UE-B have already been allocated, as discussed further below.

In step 14, the service plan management module 306 can initiate a credit authorization process with the selected service plan maintenance device. The authorization can be performed using the Diameter messaging protocol. For example, the service plan management module 306 can send, to the service plan maintenance device, a service plan request, e.g., a Credit Control Request Initialization (CCR-I) message, which can include the group identifier. As discussed above with respect to step 5, the CCR-I can also include the resource status associated with the group identifier. In this example, the UE-B is the second UE, amongst the group, to attach to the network. Therefore, the resource status would be non-zero, indicating that the UE-B is not the first UE amongst its group to attach to the network.

Once the service plan maintenance device receives the CCR-I, the service plan maintenance device can retrieve, from the CCR-I, the service plan associated with the UE-B. When the CCR-I includes the group identifier, the service plan maintenance device can retrieve, from the CCR-I, the group identifier and determine the service plan associated with the group identifier.

When the CCR-I includes the resource status associated with the group identifier, the service plan maintenance device can also retrieve, from the CCR-I, the resource status. In this example, the resource status would indicate that the UE-B is not the first UE amongst its group to attach to the network. When the service plan maintenance device determines that the UE-B is not the first UE to attach to the network, the service plan maintenance device can be configured to either (1) request the service plan management module 306 to allocate additional resources to the group of UEs, or (2) request the service plan management module 306 not to allocate any additional resources (i.e., use the resources that have already been assigned to the group).

In step 15, the service plan maintenance device can send a service plan response, e.g., a Control Answer Initialization (CCA-I) message, to the service plan management module 306. The CCA-I can include the service plan associated with the UE-B's communication session. The service plan can indicate (1) the amount of resources to be allocated to the UE-B's communication session or (2) the amount of additional resources to be allocated to the group in which the UE-B's communication session is a member.

In some embodiments, the service plan maintenance device may not send the CCA-I back to the service plan management module 306. In those embodiments, the service plan management module 306 can consider the no-response as indicating that the service plan management module 306 should not allocate additional resources to the group of UEs in which the UE-B is a member.

In step 16, the service plan management module 306 can allocate resources for the UE-B's communication session based on the group service plan. Since the UE-B is in the same group as the UE-A, the service plan management module 306 can associate UE-B's communication session with the same group service plan as UE-A. If the service plan received from the service plan maintenance device indicates that additional resources should be allocated to the group service plan, the service plan management module 306 can allocate additional resources to the group service plan.

In step 17, the gateway 300 can respond to the MME 120 that the UE-B's communication session has been established, and in step 18, the MME 120 can send to the UE-A an attach response, indicating that the UE-B is now attached to the communication network.

Once the UE-B is successfully attached to the communication network, the service plan management module 306 can track the use of resources by the UE-B's communication session. The service plan management module 306 can accumulate the use of resources as the resource status associated with the group service plan. Therefore, the resource status of the group service plan would indicate the total use of resources by the UE-A and the UE-B.

When the UE-A and the UE-B exhaust the resources allocated to the group service plan, the service plan management module 306 can decommission the UE-A and the UE-B to stop their use of the communication network.

The disclosed embodiments provide a significantly better way to manage subscriber data use and data quota. For example, the disclosed embodiments provide network operators with more opportunities to provide flexible plans to subscribers. Also, the disclosed embodiments provide network operators with opportunities to reduce hardware deployment to support subscriber session management. In addition to all the benefits to the network operators, the disclosed embodiments may also provide a better experience to subscribers given their service plan.

User Equipment and Gateway

The UE 134 described above can communicate with a plurality of radio access networks using a plurality of access technologies and with wired communication networks. The UE 134 can be a smart phone offering advanced capabilities such as word processing, web browsing, gaming, e-book capabilities, an operating system, and a full keyboard. The UE 134 may run an operating system such as Symbian OS, iPhone OS, RIM's Blackberry, Windows Mobile, Linux, Palm WebOS, and Android. The screen may be a touch screen that can be used to input data to the UE 134 and the screen can be used instead of the full keyboard. The UE 134 may have the capability to run applications or communicate with applications that are provided by servers in the communication network. The UE 134 can receive updates and other information from these applications on the network.

The UE 134 also encompasses many other devices such as televisions (TVs), video projectors, set-top boxes or set-top units, digital video recorders (DVR), computers, netbooks, laptops, and any other audio/visual equipment that can communicate with a network. The UE 134 can also keep global positioning coordinates, profile information, or other location information in its stack or memory. The UE 134 can have a memory such as a computer readable medium, flash memory, a magnetic disk drive, an optical drive, a programmable read-only memory (PROM), and/or a read-only memory (ROM). The UE 134 can be configured with one or more processors that process instructions and run software that may be stored in memory. The processor can also communicate with the memory and interfaces to communicate with other devices. The processor can be any applicable processor such as a system-on-a-chip that combines a CPU, an application processor, and flash memory. The interfaces can be implemented in hardware or software. The interfaces can be used to receive both data and control information from the network as well as local sources, such as a remote control to a television. The UE 134 can also provide a variety of user interfaces such as a keyboard, a touch screen, a trackball, a touch pad, and/or a mouse. The UE 134 may also include speakers and a display device in some embodiments.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In certain embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

The service plan management module 306 and the session control selection module 308 can be implemented, at least in part, in a network device in some embodiments. This network device can implement multiple and different integrated functionalities. In some embodiments, one or more of the following functionalities can be implemented on the network device including a security gateway (SeGW), an access gateway, a Gateway General packet radio service Serving Node (GGSN), a serving GPRS support node (SGSN), a packet data inter-working function (PDIF), an access service network gateway (ASNGW), a User Plane Entity (UPE), an IP Gateway, a Policy and Charging Rule Function (PCRF), a session initiation protocol (SIP) server, a proxy-call session control function (P-CSCF), and an interrogating-call session control function (I-CSCF), a serving gateway (SGW), and a packet data network gateway (PDN GW), a mobility management entity (MME), a mobility access gateway (MAG), an HRPD serving gateway (HSGW), a local mobility anchor (LMA), a packet data serving node (PDSN), a foreign agent (FA), and/or home agent (HA).

In some embodiments, the functionalities are provided by a combination of hardware and software in the network device. General purpose hardware can be configured in the network device to provide one or more of these specialized functionalities. The gateway can also support sessions originated from a Femto base station, which would connect to the gateway using a broadband network. A person or corporation may use a Femto base station in a home or business to support one or more mobile nodes. The gateway can provide trigger based traffic management during a handoff from a Femto base station to a macro base station, while maintaining traffic management for the mobile node. The offload gateway can be implemented as any combination of the following including an xGSN, an xGW, an xGW-SGW, and an xGW-PGW.

In some embodiments the network device is implemented using a collection of integrated circuit boards or cards. These cards include input/output interfaces for communication amongst each other, at least one processor for executing instructions and running modules that are stored in memory, and memory for storing data. The features of a network device that implements a gateway, in accordance with some embodiments, are further described below. FIG. 5 illustrates the implementation of a network device in accordance with some embodiments. The network device 400 includes slots 402 for loading application cards and line cards. A midplane can be used in the network device to provide intra-network device communications, power connections, and transport paths between the various installed cards. The midplane can include buses such as a switch fabric 404, a control bus 406, a system management bus, a redundancy bus 408, and a time division multiplex (TDM) bus. The switch fabric 404 is an IP-based transport path for user data throughout the network device implemented by establishing inter-card communications between application cards and line cards. The control bus 406 interconnects the control and management processors within the network device. The network device management bus provides management of system functions such as supplying power, monitoring temperatures, board status, data path errors, card resets, and other failover features. The redundancy bus 408 provides transportation of user data and redundancy links in the event of hardware failures. The TDM bus provides support for voice services on the system.

The network device supports at least four types of application cards: a switch processor I/O card (SPIO) 410, a system management card (SMC) 412, a packet service card (PSC) 414, and a packet accelerator card (not shown). Other cards used in the network device include line cards 466 and redundant crossbar cards (RCC) 418. The line cards 416, when loaded in the network device, provide input/output connectivity to the network and other devices, as well as redundancy connections. The line cards 416 include interfaces to the network through Ethernet, Fiber Optic, and the other communication mediums. The redundant crossbar card (RCC) 418 includes a non-blocking crossbar and connections to each of the cards in the network device. This allows a redundant connection to be made through the redundant crossbar card 418 from any one card to any other card in the network device. The SPIO card 410 serves as a controller of the network device and is responsible for such things as initializing the network device and loading software configurations onto other cards in the network device.

The system management card (SMC) 412 and switch processor card (not shown) are system control and management cards for managing and controlling other cards in the network device. The packet accelerator card (PAC) and packet service card (PSC) 414 provide packet processing, context processing capabilities, and forwarding capabilities among other things. The PAC and PSC 414 perform packet-processing operations through the use of control processors and a network processing unit. The network processing unit determines packet processing requirements; receives and transmits user data frames to/from various physical interfaces; makes IP forwarding decisions; implements packet filtering, flow insertion, deletion, and modification; performs traffic management and traffic engineering; modifies/adds/strips packet headers; and manages line card ports and internal packet transportation. The control processors, also located on the packet accelerator card, provide packet-based user service processing.

The operating system software can be based on a Linux software kernel and run specific applications in the network device such as monitoring tasks and providing protocol stacks. The software allows network device resources to be allocated separately for control and data paths. For example, certain packet accelerator cards and packet services cards can be dedicated to performing routing or security control functions, while other packet accelerator cards/packet services cards are dedicated to processing user session traffic. As network requirements change, hardware resources can be dynamically deployed to meet the requirements in some embodiments. The system can be virtualized to support multiple logical instances of services, such as technology functions (e.g., a SeGW PGW, SGW, MME, HSGW, PDSN, ASNGW, PDIF, HA, or GGSN).

The network device's software can be divided into a series of tasks that perform specific functions. These tasks communicate with each other as needed to share control and data information throughout the network device. A task is a software process that performs a specific function related to system control or session processing. Three types of tasks operate within the network device in some embodiments: critical tasks, controller tasks, and manager tasks. The critical tasks control functions that relate to the network device's ability to process calls such as network device initialization, error detection, and recovery tasks. The controller tasks mask the distributed nature of the software from the user and perform tasks such as monitor the state of subordinate manager(s), provide for intra-manager communication within the same subsystem, and enable inter-subsystem communication by communicating with controller(s) belonging to other subsystems. The manager tasks can control system resources and maintain logical mappings between system resources.

Individual tasks that run on processors in the application cards can be divided into subsystems. A subsystem is a software element that either performs a specific task or is a culmination of multiple other tasks. A single subsystem can include critical tasks, controller tasks, and manager tasks. Some of the subsystems that can run on a network device include a system initiation task subsystem, a high availability task subsystem, a recovery control task subsystem, a shared configuration task subsystem, a resource management subsystem, a virtual private network subsystem, a network processing unit subsystem, a card/slot/port subsystem, and a session subsystem.

The system initiation task subsystem is responsible for starting a set of initial tasks at system startup and providing individual tasks as needed. The high availability task subsystem works in conjunction with the recovery control task subsystem to maintain the operational state of the network device by monitoring the various software and hardware components of the network device. Recovery control task subsystem is responsible for executing a recovery action for failures that occur in the network device and receives recovery actions from the high availability task subsystem. Processing tasks are distributed into multiple instances running in parallel so if an unrecoverable software fault occurs, the entire processing capabilities for that task are not lost. User session processes can be sub-grouped into collections of sessions so that if a problem is encountered in one sub-group users in another sub-group will not be affected by that problem.

The architecture also allows check-pointing of processes, which is a mechanism to protect the system against any critical software processes that may fail. The self-healing attributes of the software architecture protects the system by anticipating failures and instantly spawning mirror processes locally or across card boundaries to continue the operation with little or no disruption of service. This unique architecture allows the system to perform at the highest level of resiliency and protects the user's data sessions while ensuring complete accounting data integrity.

Shared configuration task subsystem provides the network device with an ability to set, retrieve, and receive notification of network device configuration parameter changes and is responsible for storing configuration data for the applications running within the network device. A resource management subsystem is responsible for assigning resources (e.g., processor and memory capabilities) to tasks and for monitoring the task's use of the resources.

Virtual private network (VPN) subsystem manages the administrative and operational aspects of VPN-related entities in the network device, which include creating separate VPN contexts, starting IP services within a VPN context, managing IP pools and subscriber IP addresses, and distributing the IP flow information within a VPN context. In some embodiments, within the network device, IP operations are done within specific VPN contexts. The network processing unit subsystem is responsible for many of the functions listed above for the network processing unit. The card/slot/port subsystem is responsible for coordinating the events that occur relating to card activity such as discovery and configuration of ports on newly inserted cards and determining how line cards map to application cards.

The session subsystem is responsible for processing and monitoring a mobile subscriber's data flows in some embodiments. Session processing tasks for mobile data communications include: S1/S5/S8 interface termination for LTE networks, A10/A11 interface termination for CDMA networks, GSM tunneling protocol (GTP) termination for GPRS and/or UMTS networks, asynchronous PPP processing, IPsec, packet filtering, packet scheduling, Diffserv codepoint marking, statistics gathering, IP forwarding, and AAA services, for example. Responsibility for each of these items can be distributed across subordinate tasks (called managers) to provide for more efficient processing and greater redundancy. A separate session controller task serves as an integrated control node to regulate and monitor the managers and to communicate with the other active subsystem. The session subsystem also manages specialized user data processing such as payload transformation, filtering, statistics collection, policing, and scheduling.

In providing emulation, as MIPv4 is received from a mobile node, the session subsystem can setup a MIPv4 termination and setup a PMIPv6 session towards the core network. A session manager can track the mapping of the sessions and processing to provide the emulation and interworking between the networks. A database can also be used to map information between the sessions, and store, for example, NAI, HoA, AE information in some embodiments.

Figure 6:
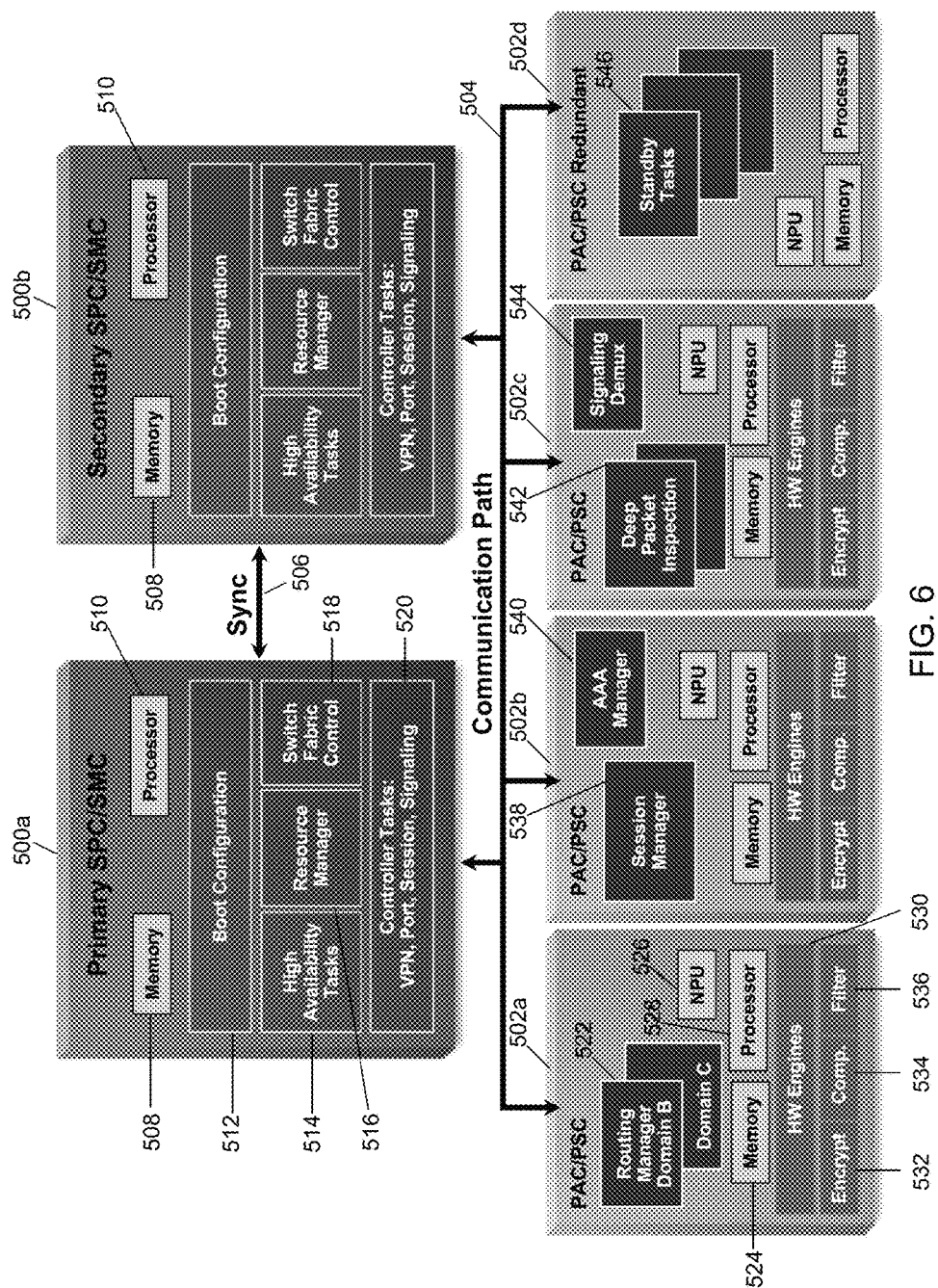
FIG. 6 illustrates a logical view of the software architecture of a network device in accordance with some embodiments.

The network device allows system resources to be allocated separately for control and data paths. For example, certain PACs/PSCs could be dedicated to performing routing or security control functions while other PACs/PSCs are dedicated to processing user session traffic. As network requirements grow and call models change, hardware resources can be added to accommodate processes, such as encryption, packet filtering, etc., that require more processing power. FIG. 6 illustrates a logical view of the software architecture of a network device in accordance with some embodiments. As shown, the software and hardware can be distributed within the network device and across different circuit boards, processors, and memory. FIG. 6 includes a primary switch processor card (SPC)/system management card (SMC) 500a, a secondary SPC/SMC 500b, PAC/PSC 502a-502d, a communication path 504, and a synchronization path 506. The SPC/SMC 500 include a memory 508, a processor 510, a boot configuration 512, high availability tasks 514, resource manager 516, switch fabric control 518, and controller tasks 520.

The SPC/SMC 500 manages and controls the network device including the other cards in the network device. The SPC/SMC 500 can be configured in a primary and secondary arrangement that provides redundancy and failsafe protection. The modules or tasks running on the SPC/SMC 500 are related to network device wide control and management. The boot configuration task 512 includes information for starting up and testing the network device. The network device can also be configured to startup in different configurations and providing different implementations. These can include which functionalities and services are capable of running on the SPC/SMC 500. The high availability task 514 maintains the operational state of the network device by monitoring the device and managing recovery efforts to avoid disruption of service. The resource manager tracks and assigns the available resources for sessions and demands on the network device. This can include load balancing among different processors and tasks running on the network device. Processes can be distributed across the system to fit the needs of the network model and specific process requirements. For example, most tasks can be configured to execute on SPC/SMC 500 or a PAC/PSC 502, while some processor intensive tasks can also be performed across multiple PACs/PSCs to utilize multiple CPU resources. Distribution of these tasks is invisible to the user. The switch fabric control 518 controls the communication paths in the network device. The controller tasks module 520 can manage the tasks among the resources of the networks to provide, for example, VPN services, assign ports, and create, delete, and modify sessions for user equipment 134.

The PAC/PSC 502 is a high-speed processing card that is designed for packet processing and the tasks involved with providing various network functionalities on the network device. The PAC/PSC 502 include a memory 524, a network processing unit (NPU) 526, a processor 528, a hardware engine 530, an encryption component 532, a compression component 534, and a filter component 536. Hardware engines 530 can be deployed with the card to support parallel distributed processing for compression, classification traffic scheduling, forwarding, packet filtering, and statistics compilations. The components can provide specialize processing that can be done more efficiently than using a general processor in some embodiments.

Each PAC/PSC 502 is capable of supporting multiple contexts. The PAC/PSC 502 is also capable of running a variety of tasks or modules. PAC/PSC 502a provides routing managers 522 with each covering routing of a different domain. PAC/PSC 502b provides a session manager 538 and an AAA manager 540. The session manager 538 manages one or more sessions that correspond to one or more user equipment 134. A session allows a user equipment 134 to communicate with the network for voice calls and data. The AAA manager 540 manages accounting, authentication, and authorization with an AAA server in the network. PAC/PSC 502 provides a DPI task 542 and a signaling demux 544. The DPI task 542 provides inspection of packet information beyond layer 4 for use and analysis by the network device. The signaling demux 544 can provide scalability of services in combination with other modules. PAC/PSC 502d provides redundancy through standby tasks 546. Standby tasks 546 store state information and other task information so that the standby task can immediately replace an active task if a card fails or if there is a scheduled event to remove a card.

In some embodiments, the software needed for implementing a process or a database includes a high level procedural or an object-orientated language such as C, C++, C#, Java, or Perl. The software may also be implemented in assembly language if desired. Packet processing implemented in a network device can include any processing determined by the context. For example, packet processing may involve high-level data link control (HDLC) framing, header compression, and/or encryption. In some embodiments, the software is stored on a storage medium or device such as read-only memory (ROM), programmable-read-only memory (PROM), electrically erasable programmable-read-only memory (EEPROM), flash memory, or a magnetic disk that is readable by a general or special purpose-processing unit to perform the processes described in this document. The processors can include any microprocessor (single or multiple core), system on chip (SoC), microcontroller, digital signal processor (DSP), graphics processing unit (GPU), or any other integrated circuit capable of processing instructions such as an x86 microprocessor.

At this point it should be noted that allocating resources for communication in a communication network in accordance with the present disclosure as described above may involve the processing of input data and the generation of output data to some extent. This input data processing and output data generation may be implemented in hardware or software. For example, specific electronic or software components may be employed in a module, an application specific integrated circuit, a processor, or similar or related circuitry for implementing the functions associated with allocating resources for communication in a communication network in accordance with the present disclosure as described above. Alternatively, one or more processors operating in accordance with instructions may implement the functions associated with allocating resources for communication in a communication network in accordance with the present disclosure as described above. If such is the case, it is within the scope of the present disclosure that such instructions may be stored on one or more non-transitory processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of at least one particular implementation in at least one particular environment for at least one particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. An apparatus for allocating resources for communication in a mobile communication network, the apparatus comprising:
    one or more interfaces configured to provide communication with a mobility management entity (MME); and a processor, in communication with the one or more interfaces, configured to run a service plan management module stored in memory, wherein the service plan management module is configured to:
- receive a session request for a mobile device from the MME, wherein the session request comprises a group identifier identifying a group of communication sessions subject to a service plan;
- receive, from a service plan maintenance device, the service plan associated with the group identifier, wherein the service plan maintenance device comprises at least one of a policy and charging rules function (PCRF) or an online charging system (OCS);
- identify, based on the service plan, a shared resources limit for the group of communication sessions;
- allocate shared resources to the group of communication sessions in accordance with the shared resources limit; and
- send a response to the MME, indicating that a session has been established for the mobile device.

2. The apparatus of claim 1, wherein the service plan management module is configured to maintain a resource status associated with the group identifier, wherein the resource status is indicative of an amount of resources consumed by the group of communication sessions.

3. The apparatus of claim 2, wherein the service plan management module is configured to update the resource status based on an amount of resources consumed by the mobile device.

4. The apparatus of claim 2, wherein the service plan management module is configured to decommission each communication session in the group when the resource status indicates that the amount of resources consumed by the group of communication sessions is greater than or equal to the shared resources allocated to the group of communication sessions.

5. The apparatus of claim 2, wherein the service plan management module is configured to send a service plan request to the service plan maintenance device to request the service plan from the service plan maintenance device, wherein the service plan request comprises the group identifier.

6. The apparatus of claim 5, wherein the service plan request further comprises the resource status of the group of communication sessions to indicate whether the requested communication session is a first communication session, amongst the group of communication sessions, to attach to the communication network since the service plan is established or refreshed.

7. The apparatus of claim 1, wherein the processor is configured to run a session control selection module that is configured to select a session control process from a plurality of session control processes to host the requested session.

8. The apparatus of claim 7, wherein the session control selection module is configured to select the session control process based on the group identifier associated with the session request.

9. The apparatus of claim 1, wherein the MME is designed to receive the group identifier from a Home Subscriber Server.

10. A method for allocating resources for communication in a mobile communication network comprising the steps of:
- receiving, at a service plan management module in a gateway, a request for a session associated with a mobile device from an MME, wherein the request comprises a group identifier identifying a group of communication sessions in which the requested session is a member;
- receiving, at the service plan management module from a service plan maintenance device, a service plan associated with the group of communication sessions, wherein the service plan maintenance device comprises at least one of a PCRF or an OCS;
- identifying, based on the service plan, a shared resources limit for the group of communication sessions;
- allocating, by the service plan management module, shared resources to the group of communication sessions in accordance with the shared resources limit; and
- sending, by the service plan management module, a response to the MME, indicating that the requested session has been established for the mobile device.

11. The method of claim 10, further comprising maintaining a resource status associated with the group identifier, wherein the resource status is indicative of an amount of resources consumed by the group of communication sessions.

12. The method of claim 11, further comprising decommissioning each communication session in the group when the resource status indicates that the amount of resources consumed by the group of communication sessions is greater than or equal to the shared resources allocated to the group of communication sessions.

13. The method of claim 11, further comprising sending a service plan request to the service plan maintenance device to request the service plan, wherein the service plan request comprises the group identifier and the resource status of the group of communication sessions to indicate whether the requested communication session is a first communication session, amongst the group of communication sessions, to attach to the communication network since the service plan is established or refreshed.

14. The method of claim 11, further comprising selecting a session control process from a plurality of session control processes in the gateway to host the session requested by the session request.

15. The method of claim 14, wherein selecting the session control process comprises selecting the session control process based on the group identifier associated with the session request.

16. An article of manufacture for allocating resources for communication in a communication network, the article of manufacture comprising:
- at least one processor;
- at least one non-transitory computer-readable storage medium; and
- instructions stored on the at least one non-transitory computer-readable storage medium;
- wherein the instructions are configured to be readable from the at least one nontransitory computer-readable storage medium by at least one processor and thereby cause the at least one processor to operate so as to:
  - receive a request for a session associated with a mobile device from an MME, wherein the request comprises a group identifier identifying a group of communication sessions in which the requested session is a member;
  - receive, from a service plan maintenance device, a service plan associated with the group of communication sessions, wherein the service plan maintenance device comprises at least one of a PCRF or an OCS;

identify, based on the service plan, a shared resources limit for the group of communication sessions allocate shared resources to the group of communication sessions in accordance with the shared resources limit; and send a response to the MME, indicating that the requested session has been established for the mobile device.

17. The article of manufacture of claim 16, wherein the instructions are configured to be readable from the at least one non-transitory computer-readable storage medium by at least one processor and thereby cause the at least one processor to operate so as to maintain a resource status associated with the group identifier, wherein the resource status is indicative of an amount of resources consumed by the group of communication sessions.

18. The article of manufacture of claim 17, wherein the instructions are configured to be readable from the at least one non-transitory computer-readable storage medium by at least one processor and thereby cause the at least one processor to operate so as to decommission each communication session in the group when the resource status indicates that the amount of resources consumed by the group of communication sessions is greater than or equal to the shared resources allocated to the group of communication sessions.

19. The article of manufacture of claim 17, wherein the instructions are configured to be readable from the at least one non-transitory computer-readable storage medium by at least one processor and thereby cause the at least one processor to operate so as to send a service plan request to the service plan maintenance device to request the service plan, wherein the service plan request comprises the group identifier and the resource status of the group of communication sessions to indicate whether the requested communication session is a first communication session, amongst the group of communication sessions, to attach to the communication network since the service plan is established or refreshed.

20. The article of manufacture of claim 16, wherein the instructions are configured to be readable from the at least one non-transitory computer-readable storage medium by at least one processor and thereby cause the at least one processor to operate so as to select a session control process from a plurality of session control processes in the gateway to host the session requested by the session request.

* * * * *